Jan. 10, 1939.  S. MÖHL  2,143,329

INDEPENDENT WHEEL SUSPENSION FOR VEHICLES OF ALL KINDS

Filed Jan. 27, 1938  3 Sheets-Sheet 1

Jan. 10, 1939.    S. MÖHL    2,143,329
INDEPENDENT WHEEL SUSPENSION FOR VEHICLES OF ALL KINDS
Filed Jan. 27, 1936    3 Sheets-Sheet 2
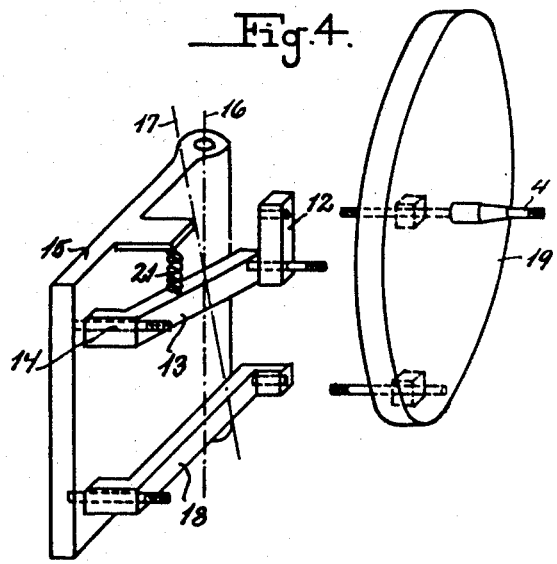
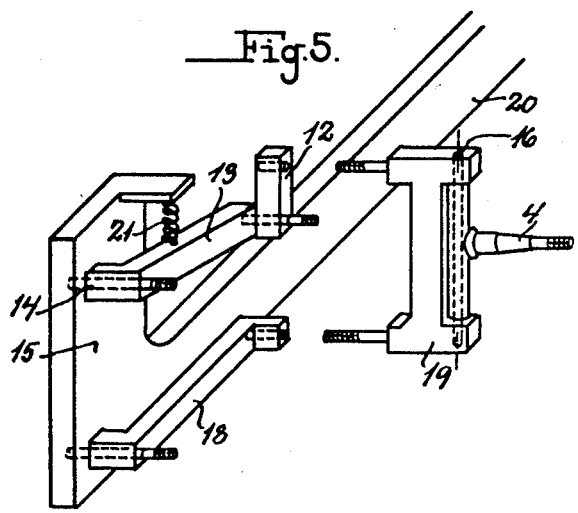

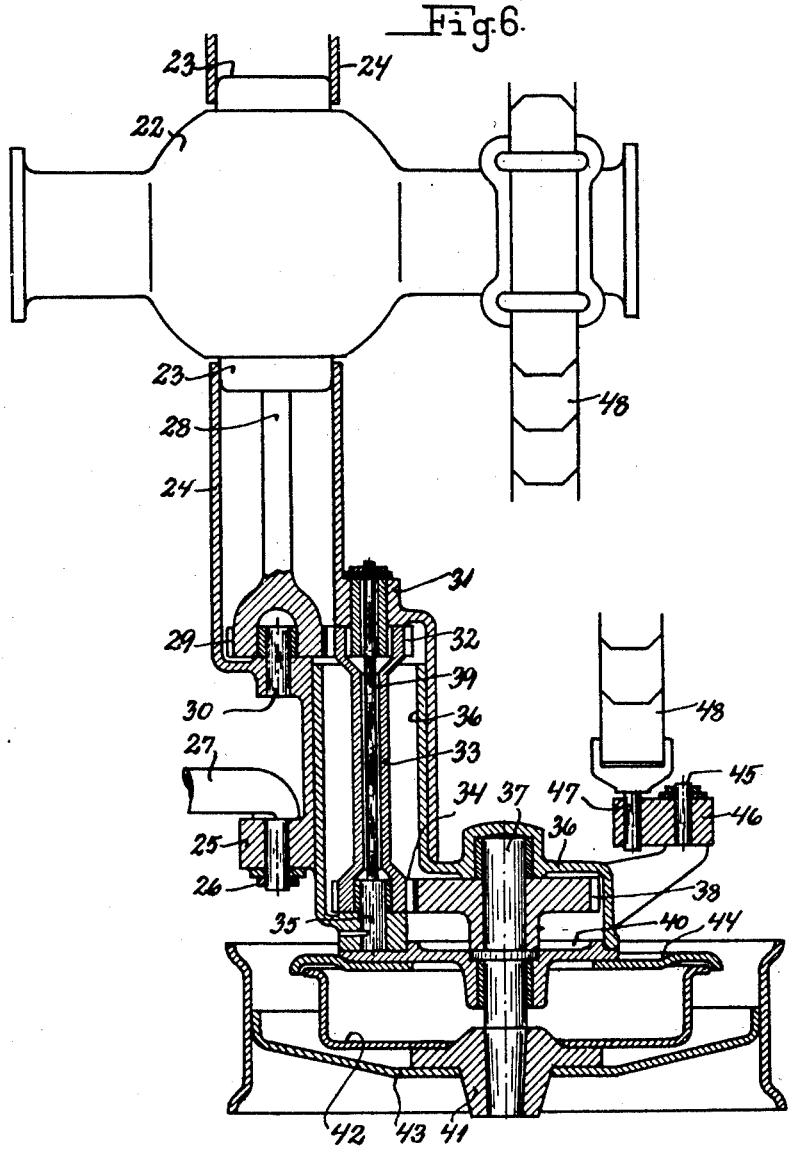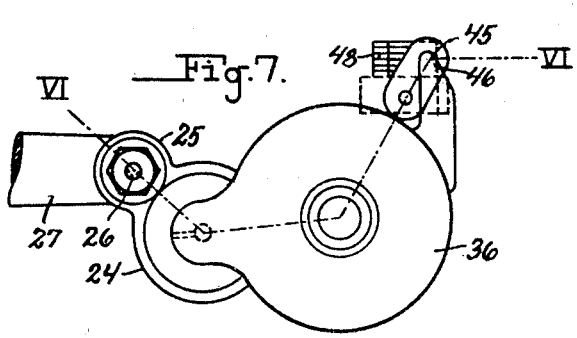

Patented Jan. 10, 1939

2,143,329

UNITED STATES PATENT OFFICE 2,143,329

INDEPENDENT WHEEL SUSPENSION FOR VEHICLES OF ALL KINDS

Steffen Möhl, Copenhagen, Denmark

Application January 27, 1936, Serial No. 61,070
In Great Britain January 30, 1935

4 Claims. (Cl. 180—71)

In normal suspension designs for sprung wheels for vehicles of all kinds, especially automobiles, the wheel is allowed to rise and fall under the influence of the variable upward force from the roadway counteracted by the force of a resilient spring, and guided either by the spring itself or through other means so that the centre of the wheel is bound to follow a more or less vertical line. This arrangement gives satisfactory resiliency for horizontal forces acting on the wheel in the direction of travel. Such forces may be due to the wheel hitting obstacles of substantial size or to sudden acceleration or deceleration.

One object of this invention is to provide such horizontal resiliency without complicating the design unduly.

Another object of the invention when used for the driving wheels of automobiles is to enable the differential to be supported rigidly in the frame.

A further object of the invention is to reduce the unsprung masses to a minimum.

A still further object of the invention is to reduce the usual dimensions of the differential housing in a driving axle. This is obtained in consequence of the differential axle shafts rotating faster than the road wheels owing to additional gear wheel ratio being provided, according to the invention, near the road wheels. A small differential housing improves ground clearance.

The invention may be used for steering wheels and/or for driving wheels. In the latter case, the transmission from the motor to the wheels will also show a resiliency, so that the wheels may proceed along the road-way at variable speed, even if the speed of the driving motor is constant and no slip takes place in the transmission. Another advantage is that the wheels move strictly in their own planes, as long as the steering lock is not altered in the case of steering wheels.

The invention will be readily understood from the following description and the accompanying drawings, where Fig. 1 is a diagram of a wheel mounting in side elevation showing the principle underlying the invention.

Figure 2 comprises diagrams of the angular movements of the mounting elements;

Figure 4 is a disassociated view in perspective of another embodiment of the invention;

Figure 5 is a similar view of a still further embodiment;

Figure 6 is a plan view with certain portions shown in horizontal section of a construction embodying the principles of the invention as applied to a travelling wheel arrangement. The sectional portions of Figure 6 are as taken substantially along the line VI—VI of Figure 7; and Figure 7 is a section in side elevation of the construction shown in Figure 6.

Figure 1:
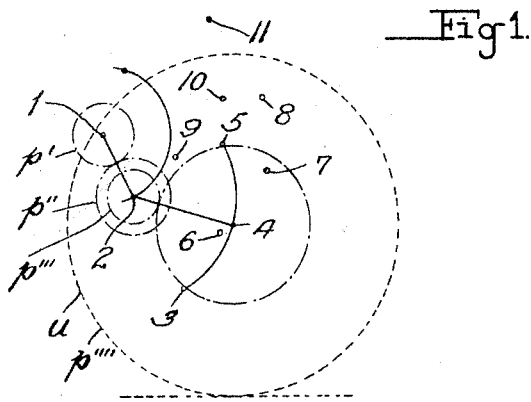

As indicated in Figure 1, the wheel axle 4 is cylindrically guided round an intermediate axle 2, which is, in its turn, cylindrically guided round an axle 1 transversally supported in the vehicle underframe.

Figure 2:
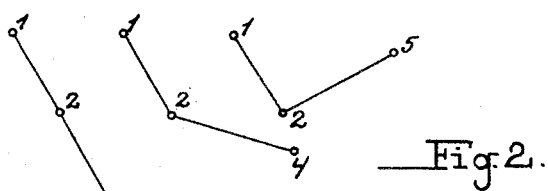

Owing to this double freedom of movement the wheel axle 4 will be able to move, relatively to the axle 1, to all the positions shown in Fig. 2 and numbered 3–11.

In Fig. 1 is also indicated the outline $w$ of the wheel and the pitch circles $p'$, $p''$, $p'''$ and $p''''$ of the gear wheels in case the wheel is a driving wheel as shown on Figs. 6 and 7.

In Fig. 2 is shown diagrammatically the angular movements of the axles relatively to one another when the wheel axle takes up the positions 3–11.

Figure 3:
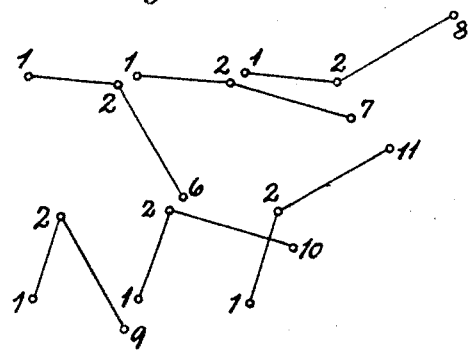
Figure 3 is a view in side elevation of a simple form of trailing wheel suspension.

Fig. 3 shows a simple form of a trailing wheel suspension according to the invention in which the wheel axle 4 is pivoted by means of a shackle 12 on a pin 2' resiliently supported by means of a spring 21 on the underframe in any known manner.

Fig. 4 shows the invention as applied to a steering wheel.

In this embodiment a steering wheel axle 4 is carried on a cranked lever 13, resiliently pivoted round a pivot pin 14 which is supported in a carrier unit 15, adapted to be steered round a substantially vertical king pin 16 supported in the frame and to resist braking torque by a torque rod 18 pivotally connected at its ends to the carrier 19 for the brake and the wheel axle and to the carrier unit 15, respectively.

The second freedom of movement above mentioned and characteristic to this invention is provided by the insertion between the wheel axle 4 and the cranked lever 13 of a link 12. Ordinarily the reaction of the roadway on the wheel will keep the same in a practically vertical position, but horizontal forces acting on the wheel in the direction of travel will bring the link 12 into a momentarily angular position.

In order to obtain easier steering it may be found an advantage to incline the king pivot 16 into a sloping position indicated at 17 in the well known manner.

Another modification closely resembling Fig. 4 is shown in Fig. 5. The only novel feature in this design is again the insertion of the link 12. The king pin 16 is here arranged between the wheel axle carrier 13 and the wheel axle 4 so that the levers 13 and 18 are pivotally mounted on a carrier 15 rigidly connected to the vehicle underframe 20.

In Figs. 4 and 5 by way of example the springing arrangement is reduced to the simplest possible form, namely a coil spring 21 resisting upward movement of the wheel axle. By the application of well known springing arrangements, considerable variation will be possible.

In Figs. 6 and 7 is shown a construction of the invention as applied to a driving wheel arrangement.

The motive power is distributed through a gear box 22 preferably located near the middle plane of the vehicle underframe. This gear box may contain all gear wheels necessary to alter speed ratio at will, and may also contain a differential gear of any known design including nonreversible types. The axle transmitting the driving power from the motor to the gear box 22 may be acted on by the brake, if preferred. The gear box (or differential) 22 may be rigidly supported in the vehicle underframe on cross-members, or may be flanged on to the central tube in the case of back-bone vehicles.

On each side of this gear box (differential housing) is formed or attached a bearing 23 for a gear wheel casing 24, provided with an additional bearing 25 which is carried by a pivot pin 26 supported on the chassis side member by means of a suitable bracket 27. In the case of a backbone type vehicle there is no chassis side member and the bearing and pin 25—27 may then be omitted, if the bearing 23 is made as long as necessary.

The axle 28 in casing 24 is driven from the gear box 22 and is rigid with a gear wheel 29. Pins 30 and 31 support the meshing gear wheels 29 and 32, of which the latter is connected rigidly through an axle 33 to a gear wheel 34. This is supported by a pin 35 which is fixed in a casing 36 pivotally mounted in the outer part of the casing 24, the said casing 36 also being provided with bearings for the wheel axle 37 and containing a larger gear wheel 38 rigidly mounted on the said axle 37. The wheels 34 and 38 are in mesh.

All bearings are for clearness shown as plain bushings. In order to hold the two casings 24 and 36 together, the pin 35 has a slender extension 39 passing through the opposite end of the casing 24. At the end of this extension 39 is mounted a nut and a washer. When balancer or roller bearings are used these may be relied upon to guide the casings laterally, and the extension 39 may then be omitted.

On the casing 36 is bolted the cover 40.

On the wheel axle 37 is mounted a hub 41 carrying the brake drum 42 and the wheel 43 in the usual way. The stationary brake members are to be mounted on the brake carrier 44 bolted on to the cover 40.

If braking is arranged for between motor and gear box (differential), brakes in the wheels may not be found necessary. But if used, such brakes in the wheels are preferably actuated by flexible brake cables or flexible hydraulic tubes.

In order to complete the suspension, a bracket or other part of the casing 36 may be connected by a shackle 46 to a pin 47, which is guided on a more or less vertical line, its upward movement being resiliently resisted by the leaf spring 48 rigidly mounted on the gear box (differential) 22.

Instead of the transverse spring 48 shown, the pin 47 may also be guided by longitudinal leaf springs or longitudinal levers mounted on transverse axles in such a manner that upward movement of the pin 47 is resiliently resisted.

In Fig. 7 the brake parts and the wheel have been removed for clearness.

If required to resist torque reactions, it may be found preferable to resiliently support two points of the casing 36, one near its front end and one near its rear end, instead of supporting only the one point 45 as shown.

Having now particularly described and ascertained the nature of my said invention and in what manner the same is to be performed, I declare that what I claim is:

1. Independent wheel suspension comprising a car frame, primary suspending means pivotally mounted on the frame for free rotation relative thereto in a substantially vertical longitudinal plane, secondary suspending means pivotally mounted on the primary suspending means for free rotation relative thereto in a substantially vertical longitudinal plane, a wheel carrier directly mounted on the secondary suspending means, resilient means tending to keep the suspending means in a certain position of equilibrium relatively to one another and to the car frame, and gearing mounted on the car frame and on the primary and secondary suspending means for transmitting a drive to the wheel axle carried by said carrier, said gearing being adapted to rotate about the axes of relative rotation between these different members.

2. Independent wheel wheel suspension comprising a car frame, primary suspending means pivotally mounted on the frame for free rotation relative thereto in a substantially vertical longitudinal plane and comprising a housing having two offset tubular portions with parallel axes, one of said tubular portions rotatably surrounding a portion of said frame to provide said pivotal mounting, secondary suspending means pivotally mounted on the primary suspending means for free rotation relative thereto in a substantially vertical longitudinal plane, said secondary suspending means having a tubular portion telescoping with the second tubular portion of said first named means and providing said secondary pivotal mounting, a wheel carrier on said secondary suspending means, resilient means between one of said suspending means and said car frame for maintaining the suspending means in a certain position of equilibrium relative to one another and to the car frame, gearing carried by said car frame and said primary and said secondary suspending means for transmitting drive to the wheel, said gearing being adapted to rotate about the axes of relative rotation between these several members.

3. Independent wheel suspension comprising a car frame, primary suspending means comprising a housing pivotally mounted on said frame for free rotation relative thereto in a substantially vertical longitudinal plane, secondary suspending means comprising a second housing pivotally mounted on said primary suspending means for free rotation relative thereto in a substantially vertical longitudinal plane, and resilient means connected between said suspending means and said frame, a rotatable drive shaft extending into said first named housing from said frame and operatively connected with a gear also enclosed within said housing, the axes of said drive shaft and gear being substantially identical with the axis of rotation of said first named suspending means with respect to the car frame, another gear carried by said second housing coaxially with the axis of rotation of the latter with respect to said first named suspending means and adapted to be driven by said first named gear, a wheel carrying axle rotatably mounted in said second named housing and operatively connected with and adapted to be driven by said second named gear.

4. Independent wheel suspension comprising a car frame and a differential housing, said housing being provided with a bearing boss, primary suspending means comprising a housing having a tubular extension thereon rotatably associated with said bearing boss whereby said primary suspending means is pivotally mounted on the frame for free rotation relative therto in a substantially vertical longitudinal plane, a second tubular extension on said primary suspending means offset from said first extension, secondary suspending means comprising a housing provided with a tubular extension telescoping with the second tubular extension on said first named housing and rotatably connected to provide a pivotal mounting for said secondary suspending means for free rotation relative to said primary suspending means in a substantially vertical longitudinal plane, a wheel carrying axle rotatably mounted in said secondary suspending means, and resilient means tending to keep the suspending means in a certain position of equilibrium relative to one another and to the car frame, a pair of intermeshing gears disposed within said first named housing and a pair of intermeshing gears disposed within said second named housing, means for driving one of the gears in said first named housing from said differential, said gear being coaxial with the axis of relative rotation of said first named housing with respect to said differential housing, the other of said gears in said first named housing being connected with one of the gears in said second named housing for rotation therewith, the axes of said last named gears being coincidental with the axis of rotation between said first named and said second named housings, the other gear in said second named housing being carried by the wheel carrying axle.

STEFFEN MÖHL.